(No Model.)

A. W. LOCKWOOD.
ICE CREAM DISHER.

No. 595,954. Patented Dec. 21, 1897.

Witnesses
A. R. Appleman Jr
J. F. Riley

Inventor
A. W. Lockwood.
By his Attorneys,
C. A. Snow & Co.

UNITED STATES PATENT OFFICE.

ARTHUR W. LOCKWOOD, OF EVERETT, PENNSYLVANIA.

ICE-CREAM DISHER.

SPECIFICATION forming part of Letters Patent No. 595,954, dated December 21, 1897.

Application filed May 27, 1897. Serial No. 638,429. (No model.)

*To all whom it may concern:*

Be it known that I, ARTHUR W. LOCKWOOD, a citizen of the United States, residing at Everett, in the county of Bedford and State of Pennsylvania, have invented certain new and useful Improvements in Ice-Cream Dishers, of which the following is a specification.

The invention relates to improvements in ice-cream dishers.

The object of the present invention is to improve the construction of ice-cream dishers and to provide simple and efficient means whereby the cutters of an ice-cream disher may be operated by the hand holding the device without moving the same from the handle, so that the disher may be entirely operated with one hand.

The invention consists in the construction and novel combination and arrangement of parts, as hereinafter fully described, illustrated in the accompanying drawings, and pointed out in the claims hereto appended.

Figure 1:
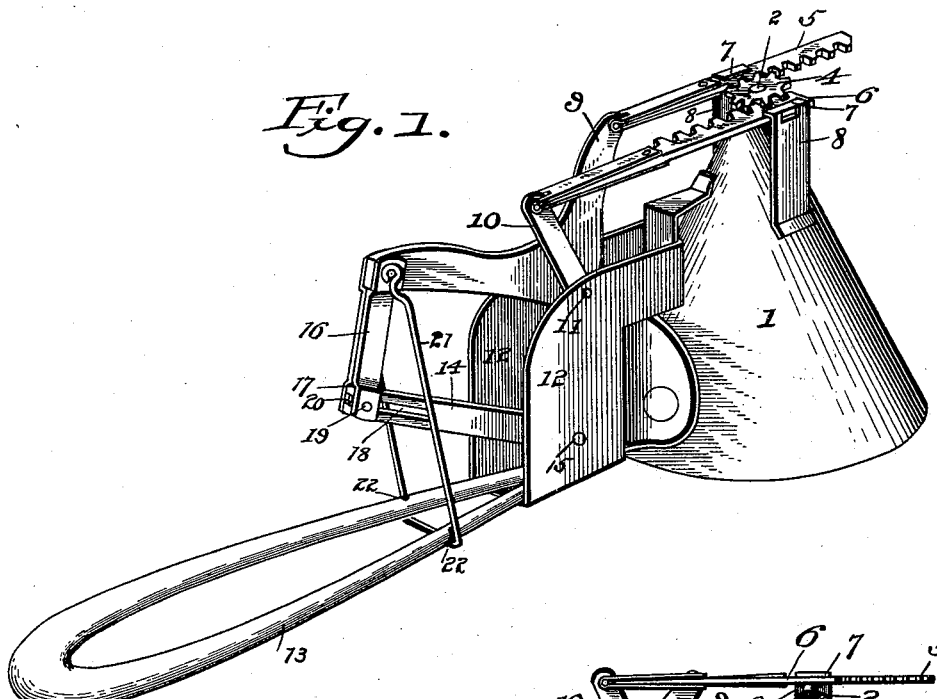
Figure 2:
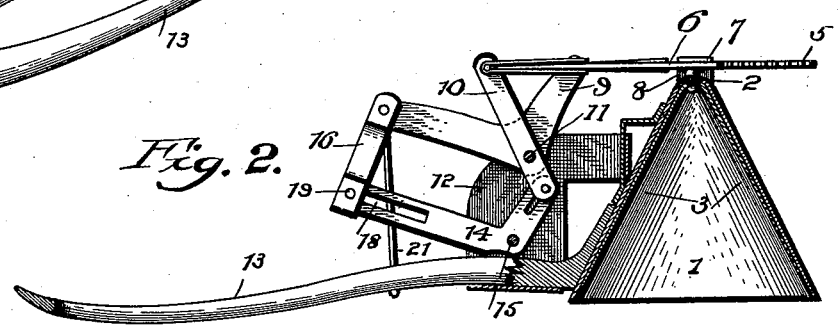
Figure 3:
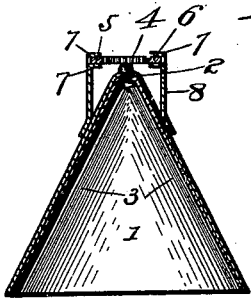

In the drawings, Figure 1 is a perspective view of an ice-cream disher constructed in accordance with this invention. Fig. 2 is a longitudinal sectional view. Fig. 3 is a transverse sectional view.

Like numerals of reference designate corresponding parts in the several figures of the drawings.

1 designates a conical mold provided at its apex with an opening through which passes a shaft 2, carrying cutters 3, constructed in the usual manner and arranged on the interior of the mold and adapted to be rotated by means hereinafter described to free the cream from the mold. The shaft is provided at its upper end with a pinion 4, meshing with a pair of reversely-reciprocating rack-bars 5 and 6, which are arranged in guides 7 of brackets 8. The brackets 8 are mounted on the mold at opposite sides thereof and are provided with inwardly-extending parallel flanges forming the guides 7.

The reciprocating rack-bars 5 and 6 are bifurcated at their inner ends and are pivoted to levers 9 and 10, which are mounted on a transverse shaft or spindle 11, and which oscillate in opposite directions. The transverse shaft or spindle 11 is journaled in suitable bearings of a substantially L-shaped support 12, which is composed of two sides secured at their ends to the mold and to the handle 13 of the disher.

The lever 9, which is of bell-crank form, has one arm connected directly to the rack-bar 5, and the other rack-bar 6 is connected by the lever 10 with a lower bell-crank lever 14, fulcrumed at its angle on a transverse pin or bolt 15. The lever 10, which is fulcrumed between its ends, is straight and has its upper end pivoted to the rack-bar 6 and its lower end to the upper arm of the lever 14.

The lower or horizontal arm of the upper bell-crank lever 9 is connected with the corresponding arm of the lower bell-crank lever 14 by a link 16, rigid with the upper bell-crank lever, and provided with a loop 17 at its lower end to receive the lever 14. The loop or opening 17 of the link 16 may be formed by a bifurcation or in any other suitable manner, and the said link may be secured to or formed integral with the upper bell-crank lever. The lower or horizontal arm of the bell-crank lever 14 is provided with a longitudinal slot 18, receiving a pin 19, which connects the lower end of the link 16 to the lever 14, and the latter is provided with a pin 20, located at the outer end of the slot and extending across the same to form a stop to prevent the lower end of the link leaving the lever 14.

The upper bell-crank lever is connected with the handle by a depending loop 21, substantially oblong and having its sides sliding in notches 22 of the handle and thereby guided thereon. The horizontal arm of the bell-crank lever is adapted to be depressed by the thumb of the hand holding the device, and this movement of the upper bell-crank lever produces a semirotation of the shaft 2, causing the cutters or blades 3 to operate over the entire inner surface of the mold and thoroughly free the cream from the same. The mechanism is operated to free the next charge of cream by raising the loop with the forefinger of the hand holding the disher. The particular arrangement of the levers causes a reverse reciprocation of the rack-bars, and the throw is sufficient to produce a semirotation of the shaft 2.

The advantages of the invention are as follows: The operating mechanism is positive and reliable and enables the disher to be operated entirely with one hand, and the arrangement of the parts is such that the cutters or blades are operated at each oscillation of the bell-crank levers—that is, the downward movement produces one operation and the upward movement a separate operation, and the operating mechanism does not have to be returned to an elevated position prior to a second operation.

What I claim is—

1. In a device of the class described, the combination with a mold, and a handle, of a shaft journaled on the mold and provided with cutters or blades, a pinion mounted on the shaft and located on the exterior of the mold, a reciprocating rack-bar mounted in suitable guides, and operating mechanism connected with and adapted to reciprocate the rack-bar and arranged adjacent to the handle, whereby it is adapted to be operated without removing the hand therefrom, substantially as described.

2. In a device of the class described, the combination with a mold, and a handle, of a shaft journaled on the mold and provided with cutters or blades arranged within the mold, an exterior pinion mounted on the shaft, a pair of oppositely-disposed reciprocating rack-bars mounted in suitable guides and meshing with the pinion, upper and lower bell-crank levers, the upper lever being connected directly to one of the rack-bars, a lever fulcrumed between its ends and connecting the other rack-bar with the other bell-crank lever, and means for reciprocating the bell-crank levers simultaneously, substantially as described.

3. In a device of the class described, the combination with a mold, and a handle, of a shaft carrying cutters or blades and journaled on the mold, a pinion mounted on the shaft, oppositely-reciprocating rack-bars meshing with the pinion, upper and lower bell-crank levers connected with the rack-bars and reciprocating the same, the lower bell-crank lever being provided in its lower arm with a longitudinal slot, a link rigidly connected with the upper bell-crank lever and provided with an opening receiving the lower bell-crank lever, and a fastening device passing through the link and arranged in said slot, substantially as described.

4. In a device of the class described, the combination with a mold, and a handle provided at opposite sides with notches, upper and lower bell-crank levers connected with each other, a shaft journaled on the mold and provided with blades or cutters, gearing connecting the bell-crank levers with the shaft, and a loop embracing the handle and having its sides sliding in the notches thereof said loop being connected with the bell-crank levers, substantially as described.

5. In a device of the class described, the combination with a mold, and a handle, of a shaft journaled on the mold and carrying cutters or blades, a pair of brackets mounted on the mold at opposite sides of the shaft and provided with guides, a pinion mounted on the shaft, rack-bars mounted in said ways and meshing with the pinion, a support connected with the handle and the mold, upper and lower bell-crank levers fulcrumed on the support, the upper lever being connected directly to one of the rack-bars, a lever fulcrumed between its ends on the support and connecting the other slide and the other bell-crank lever, a link connecting the bell-crank levers, and a sliding loop mounted on the handle and connected with the levers, substantially as described.

In testimony that I claim the foregoing as my own I have hereto affixed my signature in the presence of two witnesses.

ARTHUR W. LOCKWOOD.

Witnesses:
B. FRANK WOLFE,
GEO. P. WEAVEDING.